(12) United States Patent
Bertram

(10) Patent No.: US 6,969,460 B2
(45) Date of Patent: Nov. 29, 2005

(54) GRAYWATER DIVERTER VESSEL ASSEMBLY

(76) Inventor: James Edward Bertram, 17A Fleming Avenue, Wilson, Perth (AU) 6107

( * ) Notice: Subject to any disclaimer, the term of this patent is extended or adjusted under 35 U.S.C. 154(b) by 197 days.

(21) Appl. No.: 10/642,563

(22) Filed: Aug. 18, 2003

(65) Prior Publication Data

US 2004/0035768 A1 Feb. 26, 2004

(30) Foreign Application Priority Data

Aug. 22, 2002 (AU) .............................. 2002100710

(51) Int. Cl.[7] ........................ B01D 35/147; B01D 35/30
(52) U.S. Cl. ...................... 210/130; 137/393; 210/248; 210/420; 210/433.1
(58) Field of Search .................. 210/104, 112, 130, 210/248, 257.1, 258, 420, 433.1, 450, 451; 137/386, 393

(56) References Cited

U.S. PATENT DOCUMENTS 3,915,857 A * 10/1975 Olson ......................... 210/668
5,147,532 A * 9/1992 Leek, Jr. ....................... 210/97
5,160,606 A * 11/1992 De Simone et al. ......... 210/110
5,403,498 A * 4/1995 Morrissey et al. .......... 210/767
6,328,882 B1 * 12/2001 Rosenblatt .................. 210/104

* cited by examiner

Primary Examiner—Joseph Drodge

(57) ABSTRACT

A graywater diverter vessel assembly (as shown in FIG. 2) comprises a cylindrical side vessel 4 and valve diversion assembly 1, 2, 16. The device fits onto a vertical wastewater pipe 9, wherein a user can by closing the valve 1, divert graywater to upflow into the cylindrical side vessel 4 and pass through the vessel's removable mesh filter 5 and outflow point 7 for reuse, or alternatively by opening the valve permit graywater to flow downward through the valve diversion assembly and sewer or onsite wastewater system. The cylindrical side vessel has an over-flow outlet 8 so graywater can overflow and bypass the closed valve and flow directly to the sewer or onsite wastewater system in the event that the free outflow of graywater is restricted from either clogging of the mesh filter or other blockage, without restricting or limiting the continued normal free outflow of graywater from the building's plumbing fixtures.

4 Claims, 5 Drawing Sheets

GRAYWATER DIVERTER VESSEL ASSEMBLY

CROSS REFERENCE TO RELATED APPLICATIONS

This application claims a priority from Patent Application Number 2002100710, titled "Greywater Diverter Vessel Assembly" filed in Australia on 22 Aug. 2002 and a certified copy of the Provisional specification accompanies this Utility Patent Application.

FEDERALLY SPONSORED RESEARCH OR DEVELOPMENT

"Not Applicable"

BACKGROUND TO THE INVENTION

There is support for conservation of quality drinking water resources, whilst disposal of society's wastewater requires the provision of wastewater treatment and disposal systems, the size and cost of which to construct, maintain and operate is affected by a number of factors including the volume of wastewater to be treated and disposed of.

Graywater (spelt greywater in Australia) is generally considered to be those components of domestic wastewater that have originated from the laundry, bath, shower and hand wash basins. Whilst these streams of wastewater contribute significantly to the total wastewater volume, they contribute little to the organic content of wastewater and thus need only minimal treatment for garden irrigation. However, as untreated graywater is wastewater which contains suspended organic material and the same micro-organisms as found in toilet waste, albeit in lower concentration and numbers, the regulators of plumbing and health standards ensure graywater reuse and the associated plumbing works must occur only in an acceptable manner.

A number of graywater reuse systems and products have previously been developed and promoted, but these have not been particularly successful or accepted because they either:

- could not satisfy the established standards demanded by the regulators of plumbing and health law and codes to be approved, and were typically illegitimate ad-hock plumbing type configurations consisting of a variety of components including valves connected to flexible hoses, rubber funnels, cloth/stocking filter bags, modified water barrels, and other temporary type components and most provided little or no contingency against failure and human exposure to the graywater or sewer gases, or;
- are acceptable to regulators but are too expensive for domestic users to purchase, operate and maintain compared to the value of water savings, and are typically large below ground treatment tank systems consisting of septic tanks, aerobic treatment systems, sand filtration systems or other treatment type systems that incorporate disinfection, pumps to lift the water back to the surface, failure alarms, sewer anti-backflow fittings and other components which generally add significantly to the overall cost and such systems generally require ongoing maintenance contracts to be entered into by users with licensed contractors.

BRIEF SUMMARY OF THE INVENTION

This invention was developed to provide a miniature graywater reuse plumbing product that is simple for users to maintain themselves and passively operated, so graywater reuse could become economically viable whilst satisfying all of the plumbing and health requirements for water conservation and to reduce the volume of wastewater requiring treatment and disposal.

The graywater diverter vessel assembly fits onto a vertical wastewater pipe so a user can, by manually opening or closing a valve, divert graywater to flow into the accompanying cylindrical side vessel and pass through a removable mesh filter and outflow for reuse, or alternatively by opening the valve permit graywater to flow downward through the open valve to the sewer or onsite wastewater system.

A graywater diverter vessel assembly is comprised of two main functional parts, these being a cylindrical side vessel and valve diversion assembly.

The valve diversion assembly consists of a gate or similar valve fitted between two three-way wastewater pipe junctions so as to provide two vertical inlet and outlet connection sockets for connecting onto a vertical wastewater pipe, and two side wastewater pipe connections for connection to the accompanying cylindrical side vessel.

The cylindrical vessel has a removable graywater mesh filter which is accessed via a removable gastight lid, three wastewater pipe connection points protruding from the cylinder side consisting of a graywater in-flow point connected to the valve diversion assembly's upper side wastewater pipe connection socket and two out-flow wastewater pipe connection points being a graywater over-flow point connected back to the valve diversion assembly's lower side wastewater pipe connection socket and a filtered graywater outlet for filtered graywater to flow out of the cylindrical vessel for irrigation or other reuse.

The valve diversion assembly's upper side branch wastewater pipe connection to the side cylindrical vessel is such that graywater will not flow through this connection when the valve is opened for graywater to flow to the sewer or onsite wastewater system, and the cylindrical vessel's graywater over-flow wastewater pipe connection point is positioned such that it is set away from the influence of graywater flowing into the cylindrical vessel when the valve is closed.

The valve can be manually set to either the open or closed position. When open, graywater flowing downward through the vertical wastewater pipe and valve diverter assembly will flow directly to the sewer or onsite wastewater system, and when closed the graywater is diverted to flow into the cylindrical side vessel to be filtered for reuse.

Should the valve be closed for graywater reuse and the free flow of filtered graywater from the cylindrical vessel is restricted, because either the removable graywater mesh filter is clogged or other failure in the reuse system, the graywater level within the cylindrical side vessel will rise and overflow from the vessel and bypass the closed valve to sewer or the onsite wastewater system without inhibiting the continued free flow of graywater from the building into the cylindrical vessel.

BRIEF DESCRIPTION OF THE SEVERAL VIEWS OF THE DRAWINGS

Having thus generally described the nature of the invention, reference will now be made to the accompanying drawings, showing by way of illustration a preferred embodiment thereof, and in which.

DETAILED DESCRIPTION OF THE INVENTION

Figure 1:
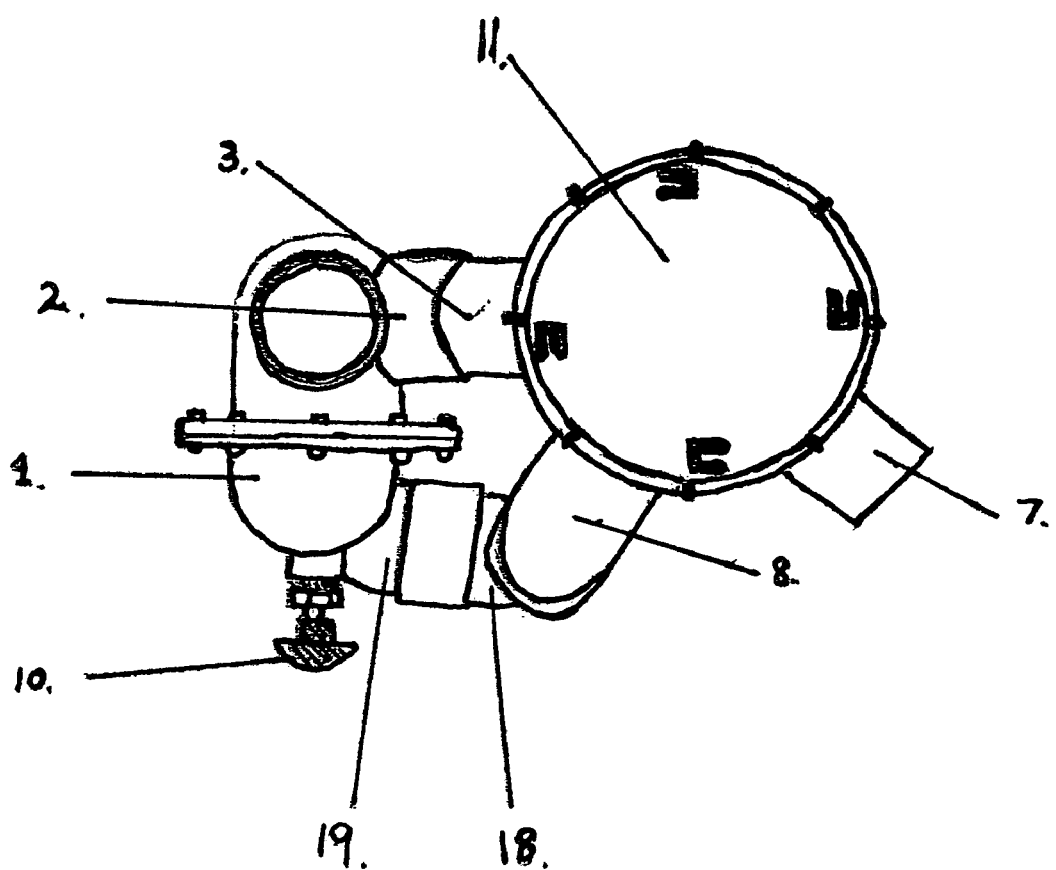
FIG. 1 is a top view of a graywater diverter vessel assembly.
Figure 2:
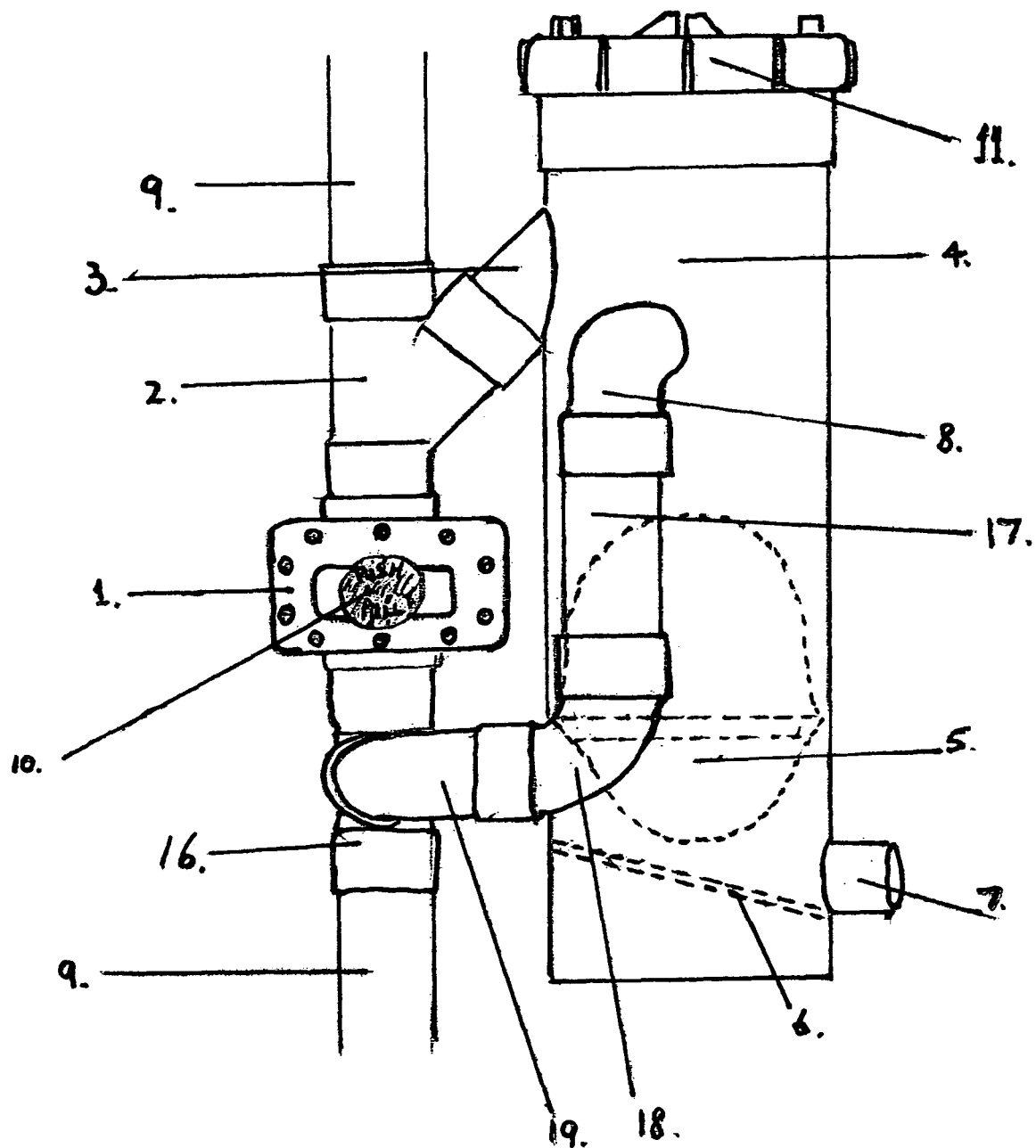
FIG. 2 is a front view of the graywater diverter vessel assembly on a vertical wastewater pipe with the internal vessel base and mesh filter shown in broken line.
Figure 3:
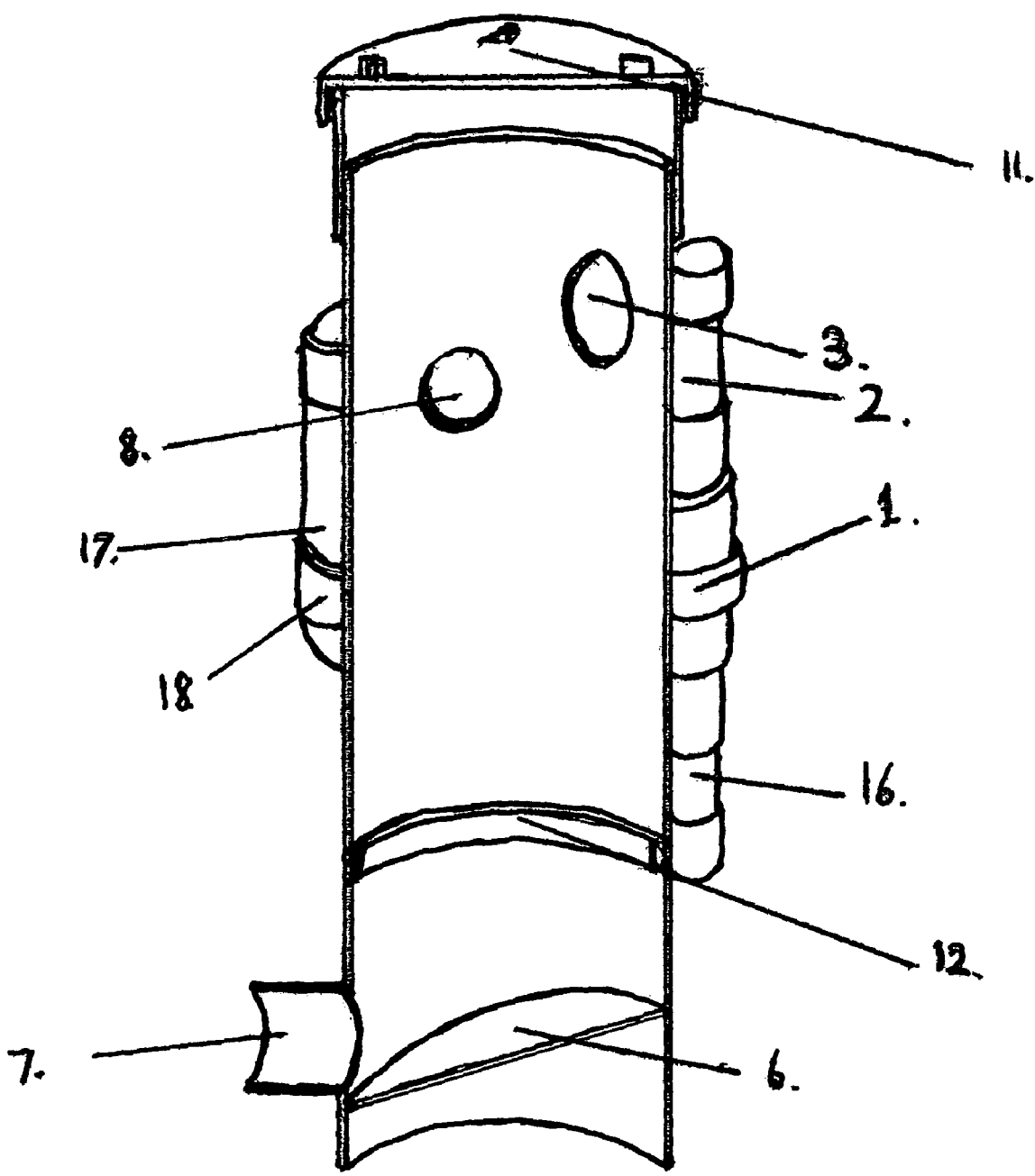
FIG. 3 is a sliced through view from within looking at the front section of the graywater diverter vessel assembly as presented in FIG. 2.
Figure 4:
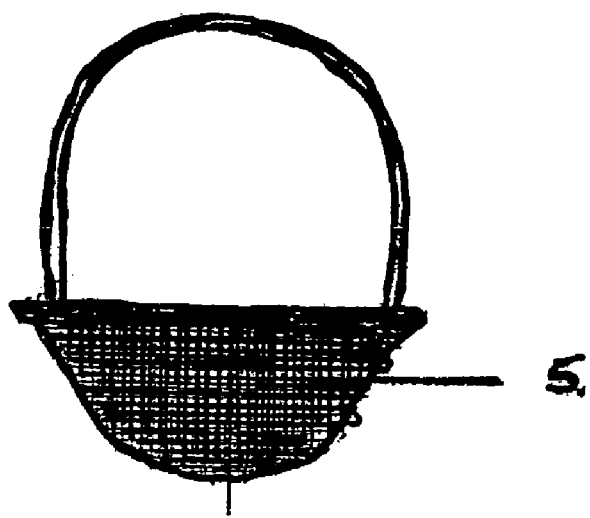
FIG. 4 is a side view of the removable graywater mesh filter.

To facilitate a better understanding of the nature of the invention the "Graywater Diverter Vessel Assembly" the invention will be described in more detail with reference to the accompanying drawings (FIGS. 1–5).

The graywater diverter vessel assembly incorporates a manually operated push-pull 10 gate valve 1 to open or close the free flow of graywater through a vertical wastewater pipe 9. It operates such that when the valve is pulled open, graywater will flow directly downwards through the vertical wastewater pipe 9, the upper three-way wastewater pipe junction 2, and the gate valve 1, and the lower three-way wastewater pipe junction 16, the lower section of the vertical wastewater pipe 9 and to the sewer or onsite wastewater system. When the gate valve 1 is pushed closed vertical flow of the graywater is blocked causing it to flow from the vertical wastewater pipe 9 around and up the 45 degree bend of the diverter valve assembly's top upper three way junction 2 to enter into the cylindrical vessel 4 via the in-flow pipe connection point 3. Graywater then falls into the cylindrical vessel 4 wherein it passes by gravity through a removable graywater mesh filter 5, which said removable graywater mesh filter 5 is held in place by a bracket 12, and the filtered graywater passes down onto the cylindrical vessel's sloped base 6 from where it flows out of the cylindrical vessel 4 via the filtered graywater out-flow pipe connector point 7 for irrigation or similar reuse 15.

Should the free flow of graywater through and out of the cylindrical vessel 4 be blocked or restricted, by either clogging of the removable graywater mesh filter 5 or blockage or failure within the irrigation or similar reuse line 15, such that filtered graywater can not freely exit the cylindrical vessel 4 via the filtered graywater out-flow pipe connector point 7, the continued in-flow of graywater through the in-flow pipe connector point 3 will cause the graywater level within the cylindrical vessel 4 to rise until that level reaches the level of the over-flow pipe connection point 8 from where any additional in-flow of graywater through the in-flow pipe connection point 3 shall immediately overflow back to sewer or the onsite wastewater system, via an over-flow return wastewater pipe 17 and wastewater pipe elbow connections 18, 19, three-way wastewater pipe junction 16 and the lower section of the vertical wastewater pipe 9.

A graywater diverter vessel assembly is designed to be installed above ground into a vertical wastewater pipe 9 in a position so the graywater in-flow point 3 and graywater over-flow point 8, of the cylindrical vessel 4, are set at a level lower than the lowest plumbing fixture water trap 14 connected to the graywater diverter vessel assembly and at a height above the sewer or onsite wastewater system plumbing's overflow relief gully or disconnector trap 13 as prescribed by the statutory requirements of the relevant health authority, water services utility or other plumbing authority in a particular location and overcome the need for any sewer anti-backflow device.

A graywater diverter vessel assembly has cylindrical vessel body 4, three wastewater pipe connection points 8, 3, 7 closed base 6, mesh filter support bracket 12 and access lid 11 preferably manufactured from suitably moulded ultra-violet resistant PVC plastic components that are glued, screwed or welded together, and has a removable graywater mesh filter 5 preferably manufactured from stainless steel or other suitable corrosion resistant material, and has two seals manufactured from rubber or similar material for use as the access lid's 11 gas seal and the removable mesh filter's 5 outer rim water seal, whereas the remainder of components used to assemble the graywater diverter vessel assembly, including three-way wastewater pipe junctions 2, 16 and elbows 18, 19 and gate valve 1, are readily available from approved wastewater plumbing component suppliers and manufactured preferably and predominantly of ultra-violet resistant PVC plastic components, so they may be readily screwed and/or glued together with the cylindrical vessel 4 to construct the graywater diverter vessel assembly.

Figure 5:
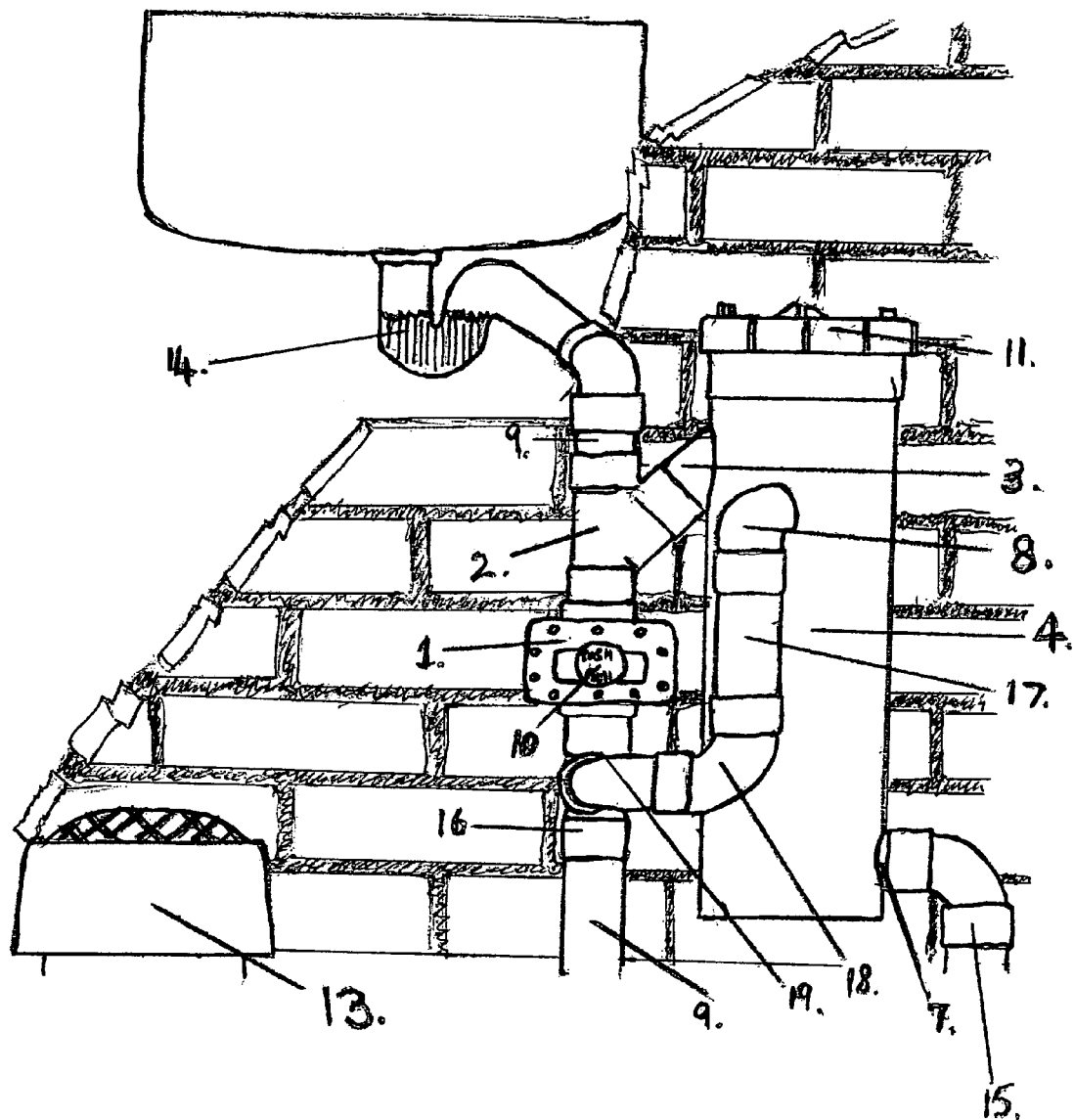
FIG. 5 is a schematic plan showing an example of how the graywater diverter vessel assembly can be fitted onto the outside wall of a building.

The above described graywater diverter vessel assembly device can be easily fitted to new or existing plumbing installations, as shown in FIG. 5, by cutting out a section of the existing vertical wastewater pipe 9 and inserting the graywater diverter vessel assembly, and may be installed inside or outside a building.

The foregoing only describes one embodiment of the graywater diverter vessel assembly and modifications that are obvious to those skilled in the art may be made thereto without departing from the scope of the invention. For example:

The graywater diverter vessel assembly device's cylindrical vessel 4 can be constructed in a modular form to allow installers the option to vary which side of the diversion valve assembly 2, 1, 16 the cylindrical vessel 4 will assume and the direction that the filtered graywater out-flow connection point 7 will assume.

The removable graywater mesh filter can be varied with use of a different filter medium or have a different mesh aperture, such as to provide a larger size for passive or mechanical sub-soil trench irrigation or a very small aperture size for irrigation by a mechanically pressurised micro drip irrigation system, or alternatively provide no filter so it might be used simply as a graywater diverter to an external filtration or other treatment and irrigation method.

The device may be manufactured to any size to suit specific vertical wastewater pipes or flows or for use only as a graywater diverter.

The valve in the diversion valve assembly may take the form of gate, ball, three-way or other suitable valve, so as to provide the same number of connections on the valve diversion assembly and provide control over the flow of graywater to the cylindrical vessel or sewer and provide a connection for overflow of graywater from the cylindrical vessel.

The circular vessel need not be cylindrical and may take any suitable vessel shape consistent with its function described herein.

What I claim as my invention is:

1. A greywater diverter and filtering plumbing device connectable into a vertical wastepipe, carrying graywater from a building, for selective diversion and filtration of graywater for constant flow and recycling under gravity without need for graywater storage or any external power source, wherein said device comprises:

(a) a vessel assembly including a vessel housing, a first upper in-flow connector point for receiving graywater from the wastepipe, a second lower filtered graywater outflow connector point for discharging filtered graywater for recycle, and a third overflow connector point for discharge of overflowing water from the vessel back into the wastepipe;

(b) a diverter assembly having upper and lower wastewater pipe connection sockets, each connectable into the vertical wastepipe, and a valve between the connection sockets constructed and arranged to give a user the option of flowing graywater directly downward through the upper and lower wastewater pipe connection sockets for sewer disposal, or alternatively set to divert the downward flowing graywater so it is directed to the vessel housing for filtration before exiting the vessel assembly through the lower out-flow connector point for subsequent recycling;

(c) a graywater filter situated in the vessel housing;

(d) a gas-tight access lid to the vessel housing for users to open and close and have access to the graywater filter for servicing; and (e) a graywater over-flow return having connection between the vessel assembly overflow connector point and the lower wastewater pipe connection socket, to operate when the valve has been set to divert the graywater for filtration, and in the event of blockage of the filter or outflow connector point, to automatically allow graywater to overflow back from the vessel housing and bypass the filter to exit the lower wastewater pipe connection socket for disposal to sewer, without inhibiting the continued free flow of graywater from the building.

2. The graywater device of claim 1, wherein the diverter assembly is operable such that when the valve is set for disposal graywater is not recycled and when it is set for recycling, graywater will not flow to sewer disposal, except when blockages causes flow through the graywater overflow.

3. The graywater device of claim 1, wherein the device is installed into a vertical wastepipe below the building's lowest connected plumbing fixture's water trap, and so as to overcome the need for any sewer anti-backflow device.

4. The graywater device of claim 1, wherein the vessel assembly and access lid are manufactured from ultra-violet resistant PVC materials.

* * * * *